(12) United States Patent  
Corbin, III et al.

(10) Patent No.: US 8,471,422 B2  
(45) Date of Patent: Jun. 25, 2013

(54) APPARATUS FOR TRANSFERRING TORQUE MAGNETICALLY

(75) Inventors: Philip Corbin, III, Sumner, WA (US); Richard Peter Braun, Port Angeles, WA (US)

(73) Assignee: Flux Drive, Inc., Sumner, WA (US)

(*) Notice: Subject to any disclaimer, the term of this patent is extended or adjusted under 35 U.S.C. 154(b) by 0 days.

(21) Appl. No.: 12/785,414

(22) Filed: May 21, 2010

(65) Prior Publication Data

US 2010/0277021 A1 Nov. 4, 2010

Related U.S. Application Data

(63) Continuation-in-part of application No. 10/591,366, filed as application No. PCT/US2005/006179 on Feb. 26, 2005.

(51) Int. Cl.
*H02K 49/00* (2006.01)

(52) U.S. Cl.
USPC .......................................... 310/103; 310/105

(58) Field of Classification Search
USPC ................................. 310/103–105, 112–114
See application file for complete search history.

(56) References Cited

U.S. PATENT DOCUMENTS 5,477,094 A * 12/1995 Lamb .......................... 310/75 D
5,712,519 A * 1/1998 Lamb .............................. 310/95

\* cited by examiner

*Primary Examiner* — Dang Le
(74) *Attorney, Agent, or Firm* — The Miller Law Offices PLC; Steve J. Miller, Esq.

(57) ABSTRACT

An apparatus for transferring torque magnetically with a primary rotary member and a secondary rotary member, wherein said rotary members are disc shaped and are sandwiched between one another. The primary rotary member has permanent magnets mounted radially on a disc, the secondary rotary member having disc geometry with electro conductive material arranged on it. The secondary rotary member also having magnetically permeable material. The new improvements herein have modified the earlier cylindrical design to that of a an alternative disk—plate/shape design utilizing the similar magnetic circuit that which overcomes some deficiencies/problems in the prior art, in that the prior art required more precision alignment of the electro-conductive rotor inside the magnetic can array and requires additional strength in the foundations of the machinery in order to maintain the air gap between the magnet can and the rotor assembly.

2 Claims, 9 Drawing Sheets

"SOFT – START"

Actual Current (A) consumed vs. time to start 25 hp, belt driven blower.

A Flux Drive ™ coupling is compared to a rigid flexible coupling during this starting event.

FIG. 6

"SOFT – START"

Actual power (kW) consumed vs. time to start 25 hp, belt driven blower.

A Flux Drive ™ coupling is compared to a rigid flexible coupling during this starting event.

APPARATUS FOR TRANSFERRING TORQUE MAGNETICALLY

CROSS REFERENCE TO RELATED APPLICATIONS

This application is a Continuation-in-Part of U.S. application Ser. No. 10/591,366 which was U.S. national stage application of, and claimed priority from PCT/US2005/06179 filed on Feb. 26, 2005, said PCT application further claiming priority from U.S. patent application Ser. No. 10/790,571 filed on Mar. 1, 2004.

STATEMENT REGARDING U.S. FEDERALLY SPONSORED RESEARCH OR DEVELOPMENT

Not Applicable.

DESCRIPTION OF ATTACHED APPENDIX

Not Applicable.

TECHNICAL FIELD OF THE INVENTION

The present invention relates to rotational magnetic torque transfer devices utilizing adjacent rotating discs, said adjacent discs alternating between having, and not having magnets thereon. The discs not having magnets thereon, have electro-conductive material.

BACKGROUND OF THE INVENTION

It is desirable to devise a permanent magnet excited mechanism for transmitting variable torque in drive applications. Specifically there is a need to couple constant speed devices such as motors or engines to variable output speed and torque devices such as pump impellers, fans, propellers, wheels, etc.

Transmission devices including various eddy current clutches have been in use for some time in various forms. An examination of the prior art shows that these eddy current devices are limited to three general types Current fixed gap permanent magnet disk clutches are limited in their ability to transmit large amounts of torque and are constructed in a manner which causes instability at higher speeds. These limitations relegate the practical application of these devices to low speed, low horsepower application.

Eddy current clutches that use DC current to generate and vary the flux density in a fixed gap mechanism. These devices are available in a wide range of horse power but are expensive, complicated and require a DC current and control to induce the torque. There are applications where the DC current is not desirable or where the apparatus for controlling the torque producing currents are unreliable.

Current variable gap permanent magnet disk clutches are limited in their ability to transmit large amounts of torque and are constructed in a manner which causes instability at higher speeds. These limitations relegate the practical application of these devices to low speed, low horsepower application.

The apparatus described utilizes recent developments in magnetic material technology, in conjunction with architecture designed for mechanically stable operation. This will allow the apparatus to be used in a full range of power transmission applications including high horsepower applications. The configuration of the device also makes it stable and able to operate at higher input speeds, which are natively present in some motors and engines, The described apparatus is a device that uses permanent magnets and conductors arranged in an optimal manner to generate the magnetic flux in a power transmission drive.

The object of this invention is to present a modification to the Inductive magnetic circuit utilizing an alternative orientation of the electro-conductive rotor design which will have a disk shape (plate) construction with an outer ring and inner ring of electro-conductive material surrounded by steel, assembled with rotor bars connecting the inner and outer rings (end rings) radially (i.e., from the inside ring to the outside ring). The bars can be constructed of various shapes (i.e., round, square, etc.) connecting them as required for adjustment of the torque profile developed by the device.

The Magnet rotor assembly would also have the same radial disk shape forming an array of magnets oriented from the inside of the rotor disk to the outside and have the magnet polarity opposed at adjacent magnets and magnetized through the thickness of the rotor plate. Note that one (1) magnet rotor would be surrounded by two (2) inductive rotor assemblies (i.e., one on both sides of the magnet rotor); thereby allowing more flux/power to be transmitted during operation.

Our testing has revealed that our inductive coupling with the rotor bar construction, has an inherent 'soft-start' capability during starting. This allows a high inertia load to be accelerated by a motor (or other torque/power source) from rest to full torque at no more than 150% of the rated torque of the coupling. This performance benefit also works to limit torque at any load condition to no more than 150% torque and to also dampen out torque pulsations (i.e., torsional vibration) by the same limits. This would benefit all types of power transmission systems that have high starting toques or the possibility of high spike loading that can cause damage.

The instant invention's inductive magnetic circuit geometry can also be utilized as Dynamometers for braking and tensioning. This would be accomplished by locking the inductive rotor and installing addition cooling piping inside the rotor to dissipate the braking or tensioning/slip heat. Both brake systems and tensioning systems would benefit by the fact that there are no components to wear out (i.e., brake pads, etc.).

An additional capability of tensioning would be torque limiting during rotation of valves or other such devices. This benefit would eliminate the chance that a valve stem/shaft could be broken during the closing process (i.e., if debris is caught in the valve body during closing). This could be called: 'Inductive Limit Torque'.

BRIEF SUMMARY OF THE INVENTION

The present invention utilizes permanent magnets to transmit variable or fixed torque between two rotating elements. The instant invention is an improvement in the geometric arrangement and magnetic circuit to that claimed in applicant's first patented invention U.S. Pat. No. 7,294,947 and other art. The instant invention modifies the original cylindrical design to that of a an alternative disk—plate/shape design utilizing the same magnetic circuit that which overcomes some deficiencies/problems in the prior art, in that the prior art required more precision alignment of the electro-conductive rotor inside the magnetic concentric cylinder array and requires additional strength in the foundations of the machinery in order to maintain the air gap between the magnet can and the rotor assembly. This improvement overcomes these aforementioned deficiencies by reconfiguring the inside magnetic rotor assembly between two (2) outside electro-conductive rotor plates; thereby balancing the magnetic attractive forces developed during assembly.

The proposed invention overcomes previous limitations by taking advantage of new technologies in magnet materials and new optimal geometries, and provides a stable means of mechanically transmitting large amounts of transmitted torque without the need for large external current controls.

The improvement more particularly described herein comprises (1) an inductive magnetic circuit contained within a disk—plate shape rotor assembly with an orientation of the electro-conductive rotor bars comprising an outer ring and inner ring of electro-conductive material with rotor bars connecting the inner and outer rings (end rings) radially (i.e., from the inside ring to the outside ring). The electro-conductive material is surrounded by ferrous material steel to form the rotor assembly. The bars can be constructed of various geometric shapes (i.e., round, square, etc.) as required for adjustment of the torque profile developed by the device. (2) a Magnet rotor assembly having the same radial disk shape and an array of magnets oriented from the inside of the rotor disk to the outside and have the magnet polarity opposed at adjacent magnets and magnetized through the thickness of the rotor plate. Note that one (1) magnet rotor would be surrounded the two (2) inductive rotor assemblies (i.e., one on both sides of the magnet rotor); thereby allowing balanced flux/power to be transmitted during operation. In the rotary member that comprises the electro-conductive elements and magnetically permeable materials, said rotary member's permeable materials may not be ferromagnetic, and may not have permanent magnets.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

Description of selected embodiments of the invention included herein are listed as follows.

DETAILED DESCRIPTION OF THE INVENTION

Detailed descriptions of preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
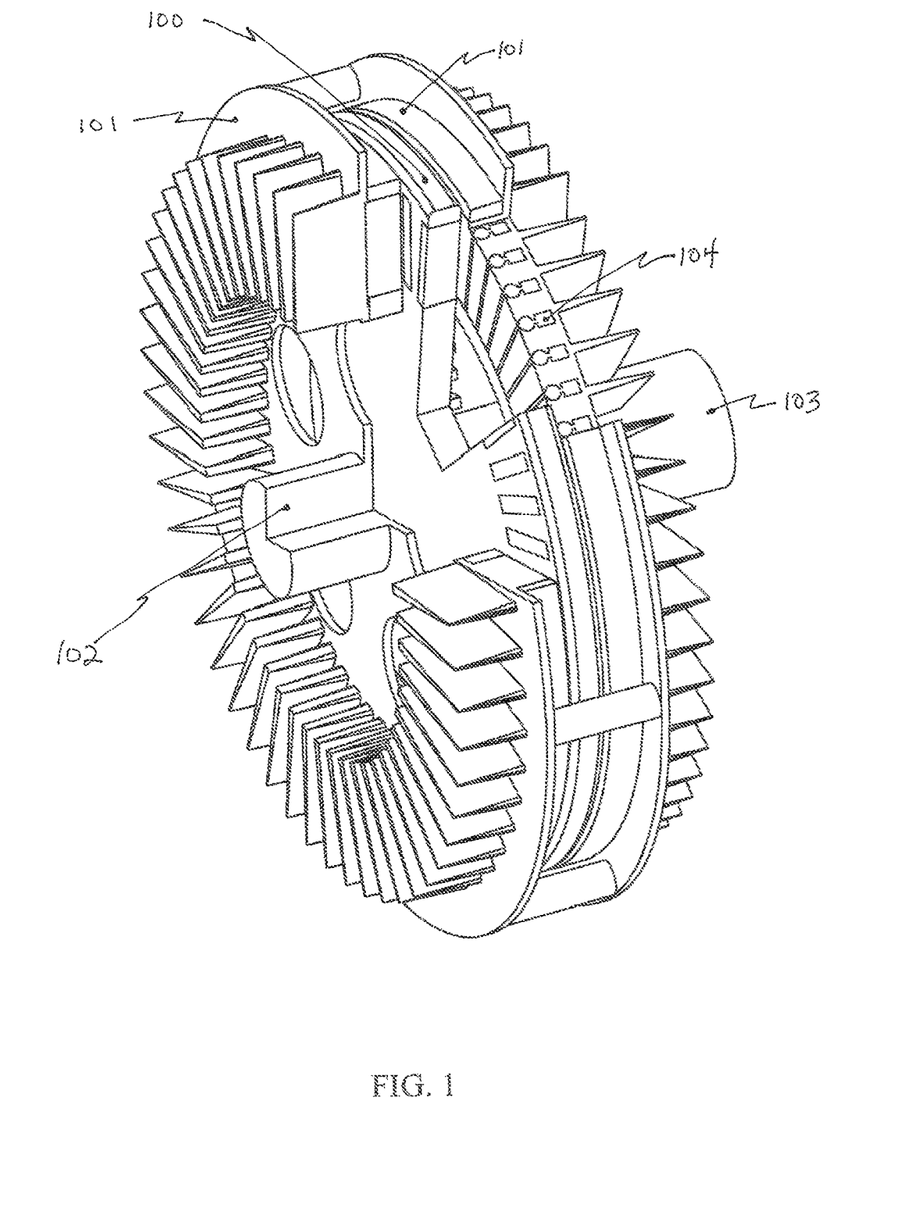
FIG. 1 is a perspective view of the alternate disk—plate embodiment of the invention utilizing two (2) flat electro-conductive magnetic circuit rotor plates and magnetic rotor plate assembly.
Figure 2:
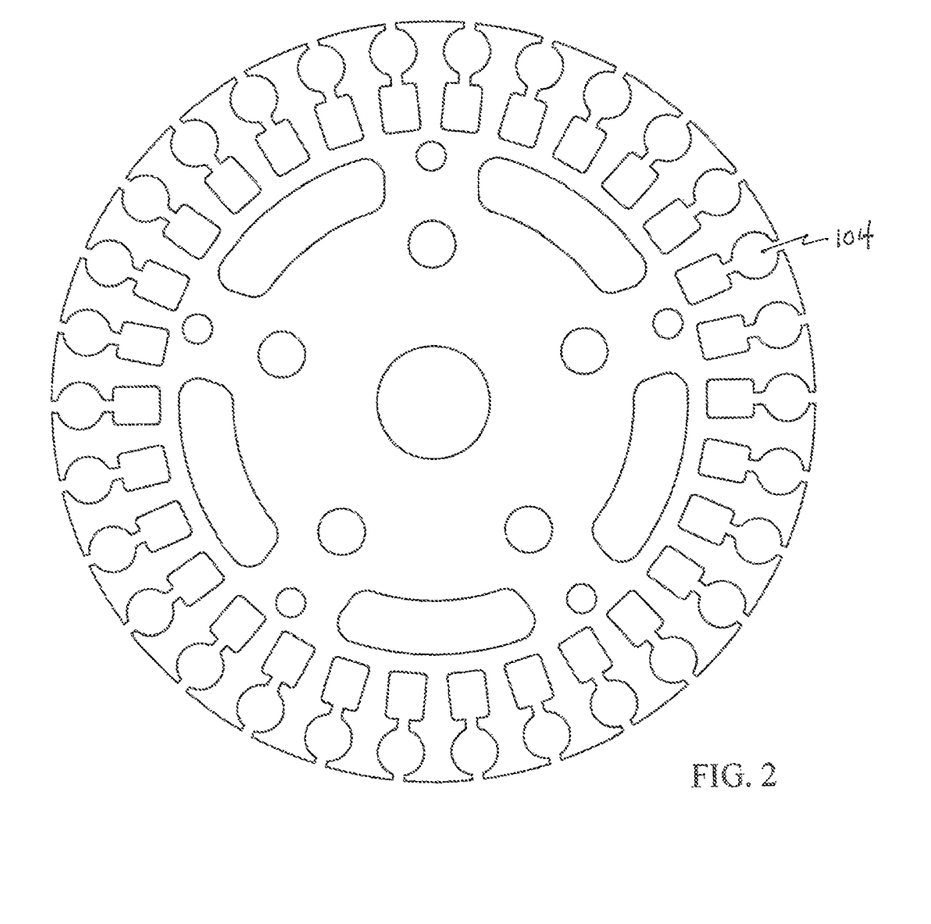
FIG. 2 is a section view of an alternate form of an electrically conductive dumbbell rotor bar shape configuration.
Figure 3:
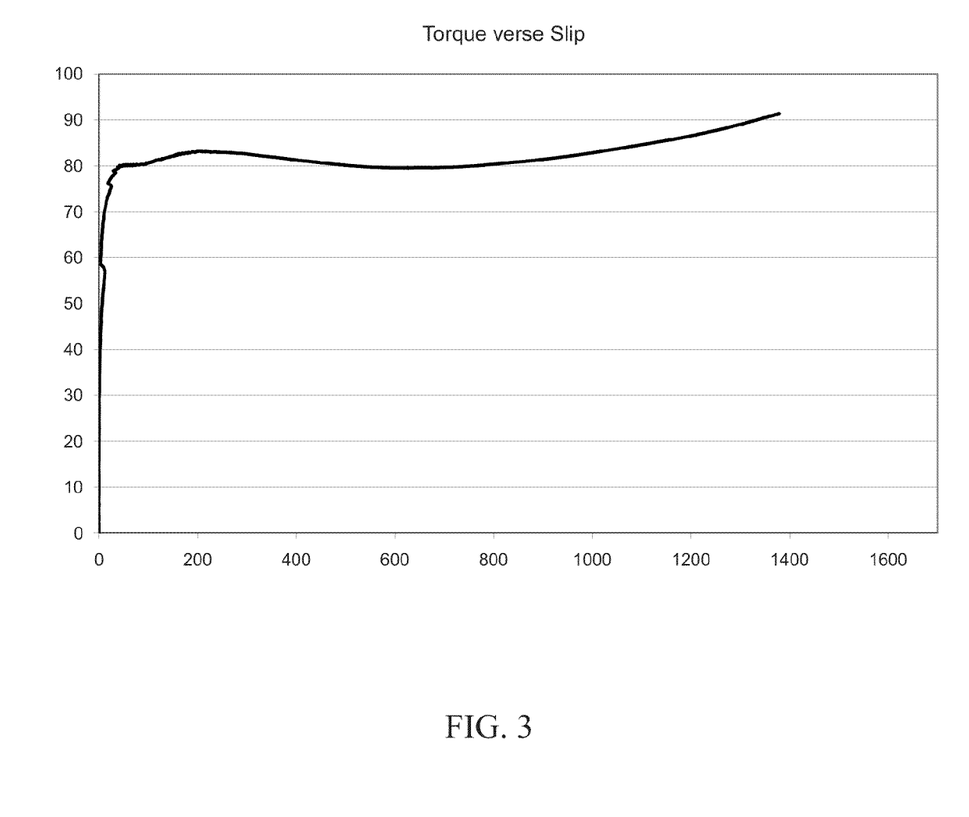
FIG. 3 is a plot representing the Torque verses Slip curve for the alternate dumbbell rotor bar shape configuration.
Figure 4:
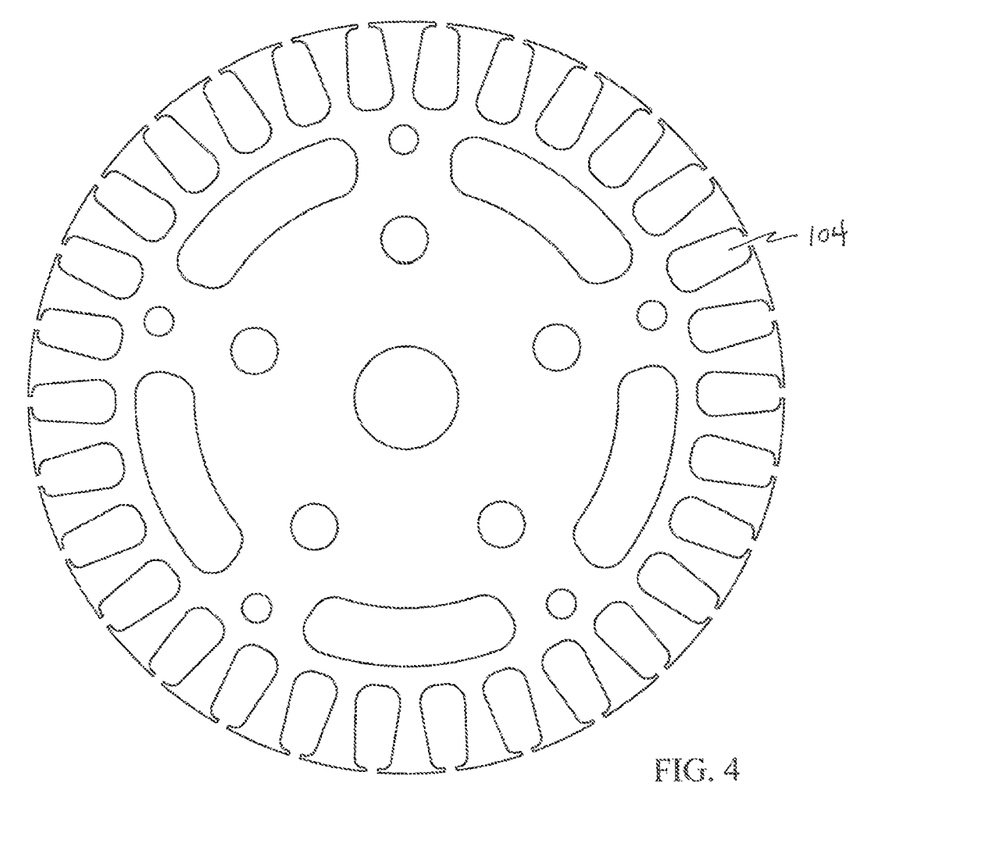
FIG. 4 is a section view of an alternate form of an electrically conductive trapezoid rotor bar shape configuration.
Figure 5:
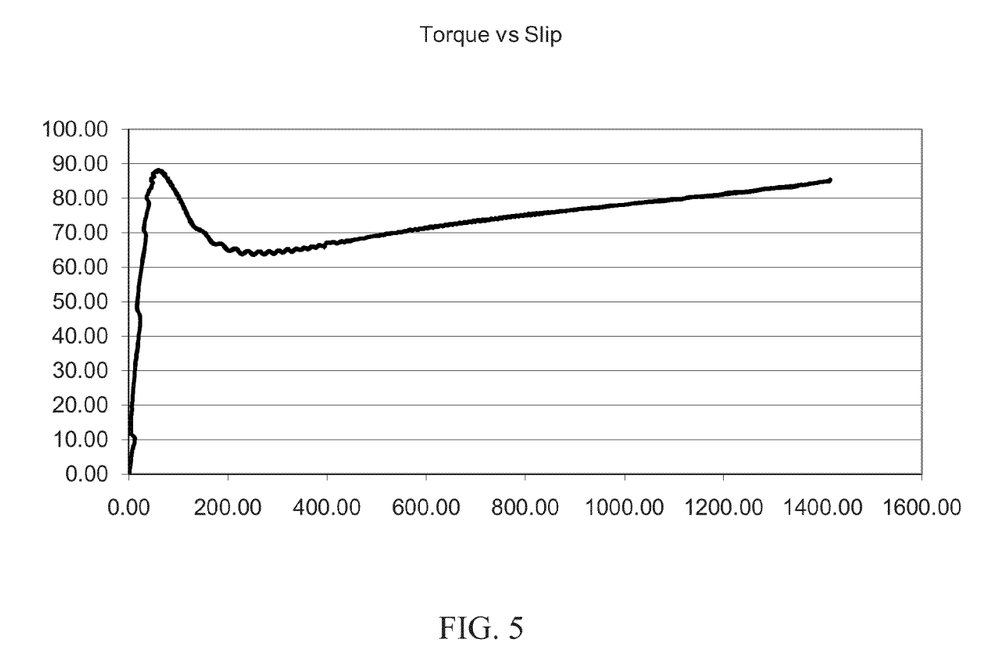
FIG. 5 is a plot representing the Torque verses Slip curve for the trapezoid rotor bar shape configuration.
Figure 6:
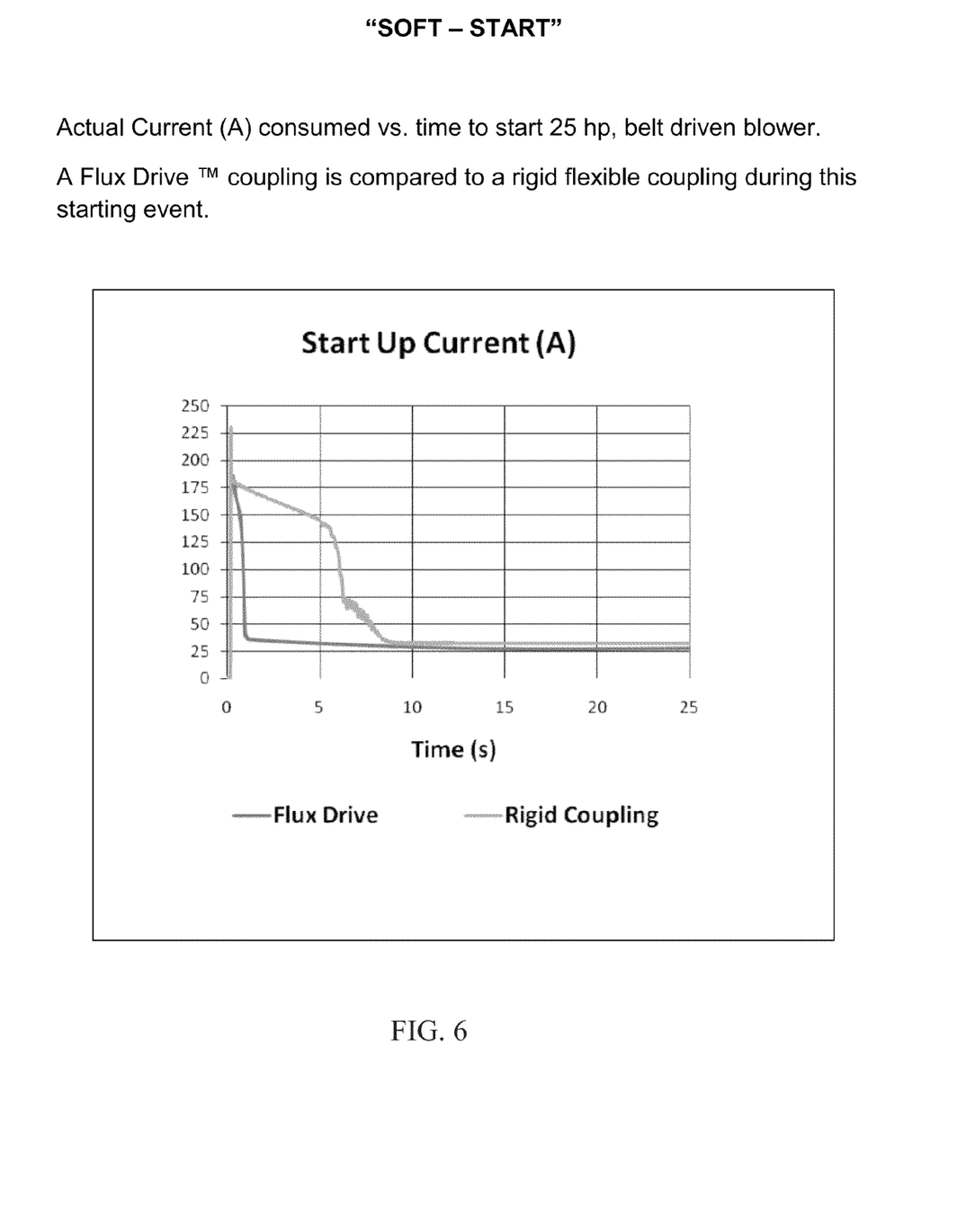
FIG. 6 is a plot representing the 'soft-start' capability (provided during starting a high inertia load) of the invention's electro-conductive magnetic circuit. The plot is a comparison of Current verses Time for both the 'Flux Drive' and a standard 'rigid' flexible coupling.
Figure 7:
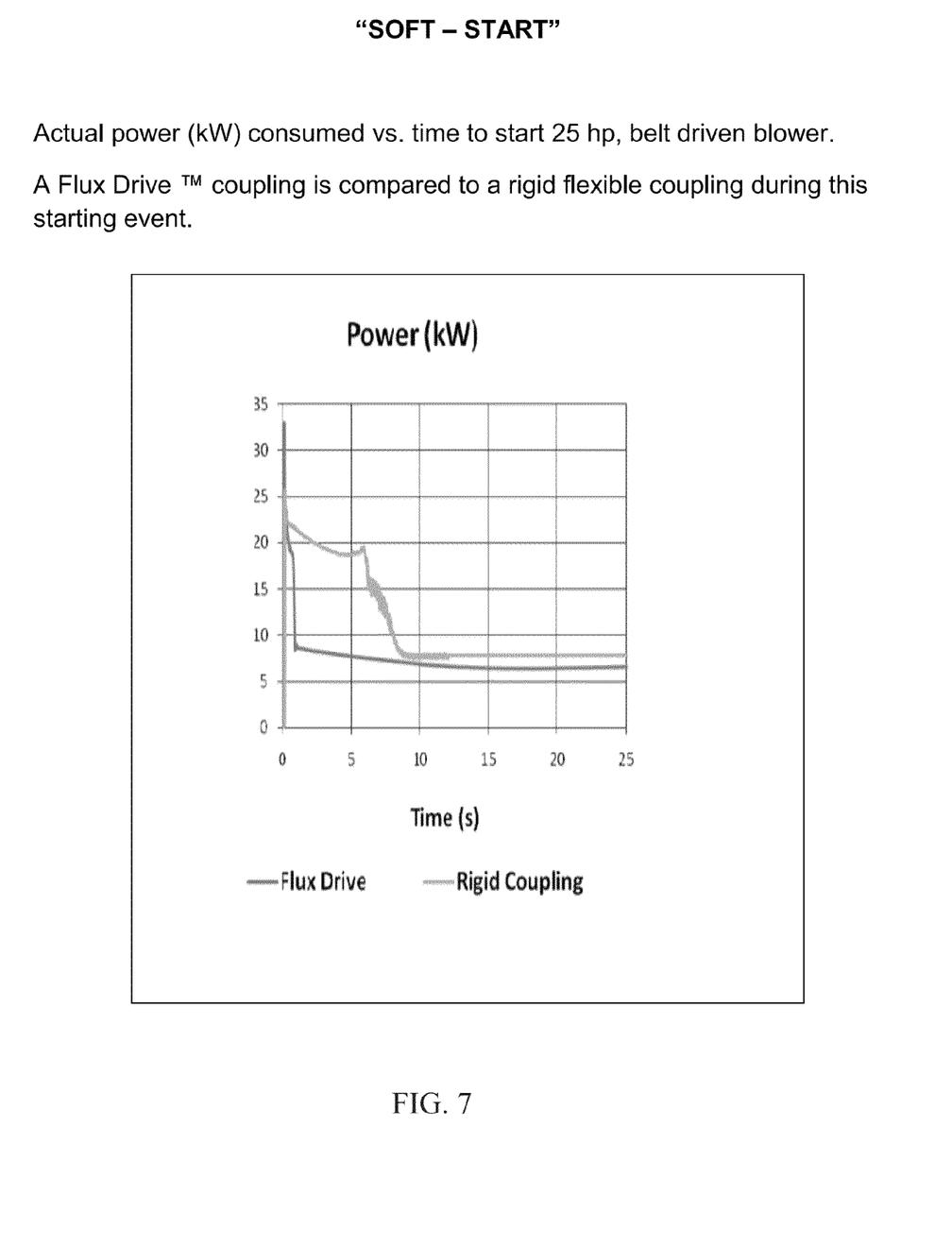
FIG. 7 is a plot representing the 'soft-start' capability provided during starting a high inertia load of the invention's electro-conductive magnetic circuit. The plot is a comparison of Power verses Time for both the 'Flux Drive' and a standard 'rigid' flexible coupling.
Figure 8:
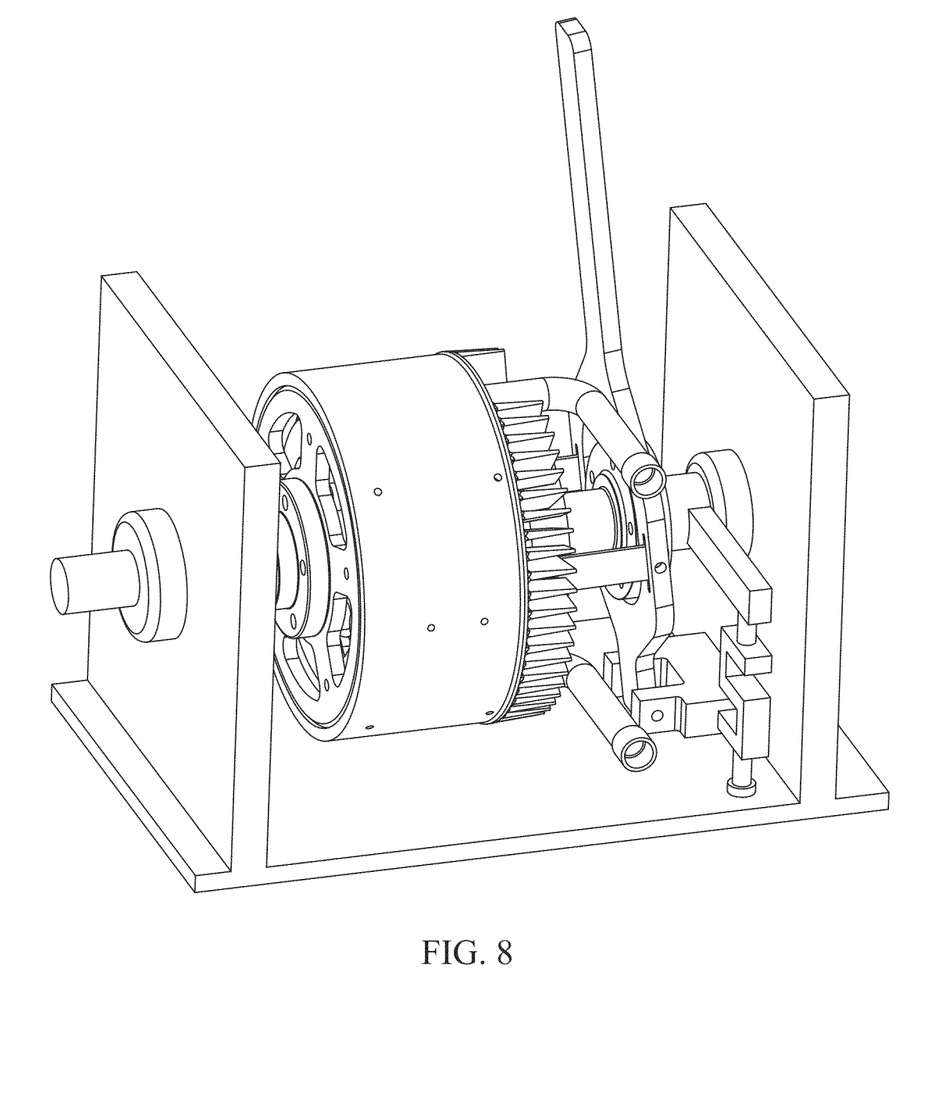
FIG. 8 is a perspective view of an alternate embodiment of a dynamometer.
Figure 9:
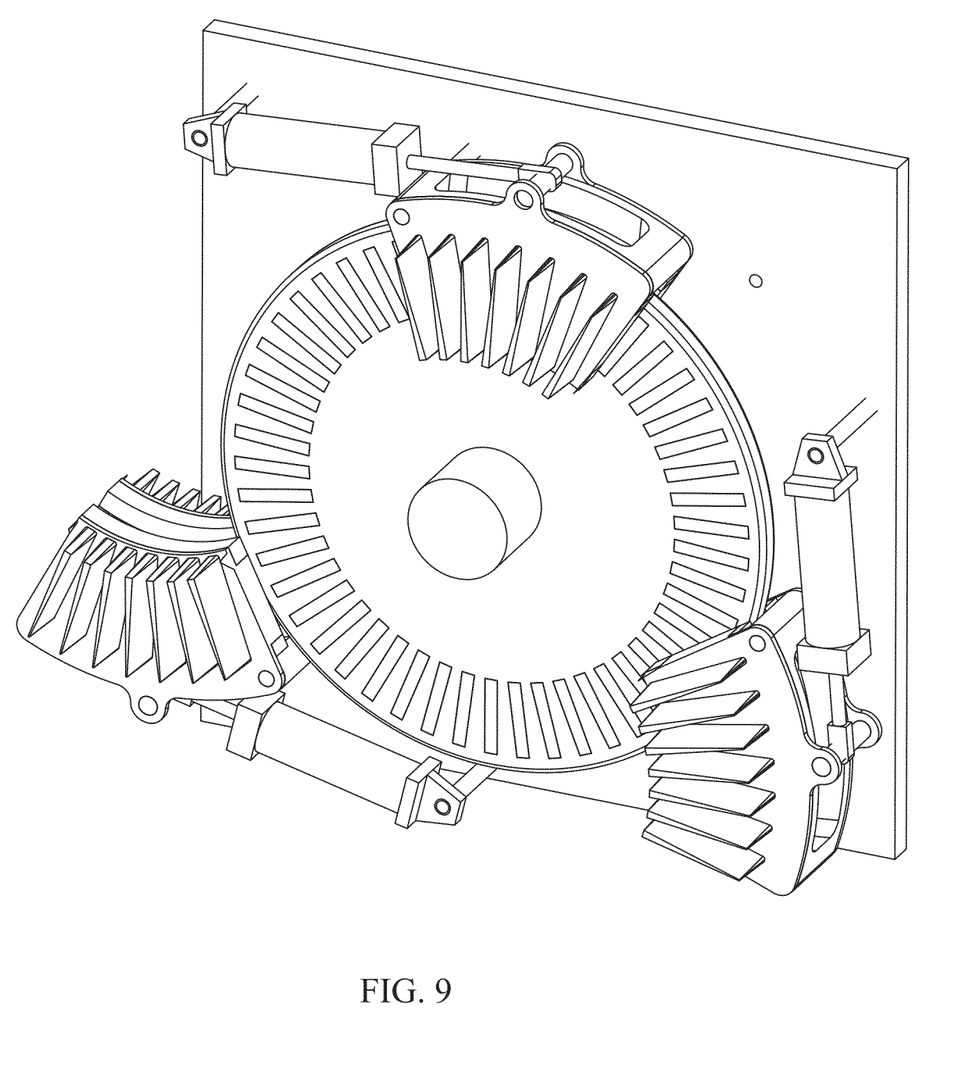
FIG. 9 is a perspective view of an alternate embodiment of a tensioning device.

In the embodiment of the improved invention shown in FIGS. 1-8, there are a total of three circular rotating discs, wherein there the center disc (100) is 'sandwiched' between the outer two discs (101). The two outer surrounding discs are mechanically connected to one rotor (102), and the center rotating disc is mechanically connected to another mechanically independent rotor (103). One rotor comprises the magnet-carrying rotor (100) is made up of magnetically permeable material to lower the reluctance of the magnetic circuit. There are two (2) magnetically permeable rotor plates (101) supporting the electro-conductive rotor bars (104) therein, are fabricated with magnetically permeable material, which completes the magnetic field circuit extending from a rotating magnet ring (100) therein through the air gap to an electro-conductive ring plate. In this embodiment, the magnetically permeable rotor's magnetically permeable material extends up through the openings in the electro-conductive rotor plate ring (101) therein. This reduces the air gap between the magnet rotor plate ring therein and the electro-conductive plate ring, and thereby increases the magnetic flux while allowing the induced current in the electro-conductive rotor plate bars to surround the magnetically permeable material. This improved geometry is optimal for producing strong induced electromagnetic fields in the rotors, thereby maximizing the transmitted torque and rendering the device more efficient at transmitting energy.

While the invention has been described in connection with a preferred embodiment plus two alternative embodiments, it is not intended to limit the scope of the invention to the particular forms set forth, but on the contrary, it is intended to cover such alternatives, modifications, and equivalents as may be included within the spirit and scope of the invention as defined by the appended claims.

What is claimed is:

1. An apparatus for transferring torque magnetically comprising:

Two (2) disc shaped primary torque driving rotor members and a disc shaped secondary driven rotary member, said two (2) primary rotary members being located on either side of said secondary rotary member, the secondary rotary member being located between the two (2) said primary members, the two (2) primary rotary members having electroconductive elements and magnetically permeable material, said primary rotary members' magnetically permeable material having a plurality of slots formed into said primary rotors' perimeter and said plurality of slots being filled with said electroconductive elements, the secondary rotary member having permanent magnets mounted on it, said primary rotary members being connected to and driven by a torque producing device, and said secondary member being connected to a torque utilizing device whereby rotation of primary rotary members cause rotation of said secondary rotating member by some or all of the magnetic flux lines emanating from said permanent magnets mounted on said secondary rotary member cutting through the electroconductive material on said primary rotary members thereby generating torque and rotation in the secondary rotary member.

2. The apparatus of claim 1 wherein there may be a plurality of primary rotary discs placed adjacent to one another, and a plurality of secondary rotary discs placed there between, with said primary rotary discs being mechanically connected to rotate together, and with said secondary rotary discs being mechanically connected to rotate together.

* * * * *